Sept. 6, 1932. J. B. J. M. ABADIE 1,875,972
MAINTENANCE OF THE PRESSURE IN VACUUM TUBES
Filed Aug. 15, 1927   2 Sheets-Sheet 1
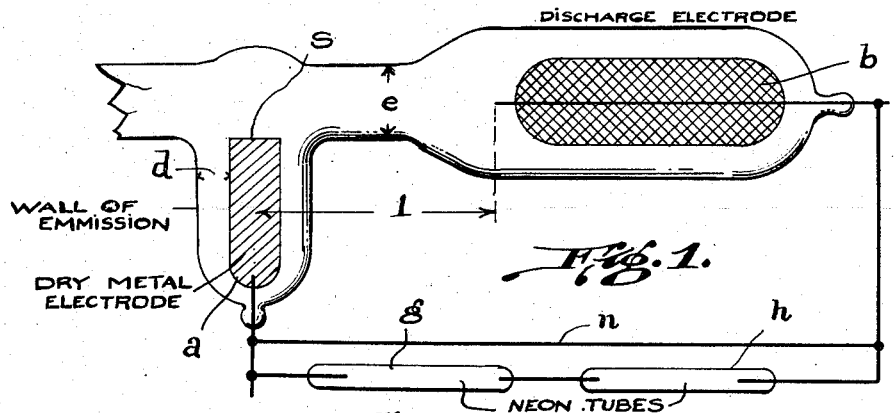
Fig. 1.
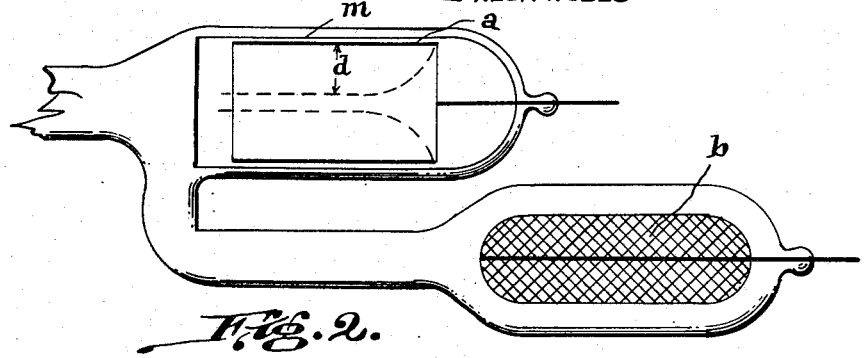
Fig. 2.
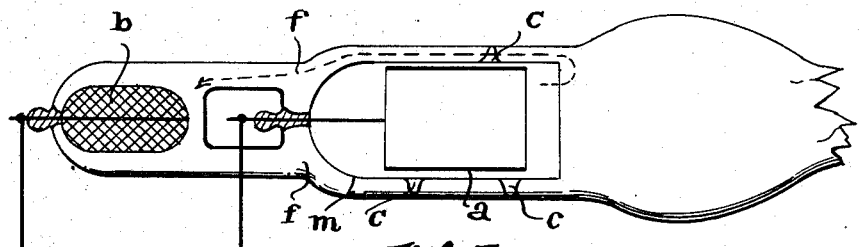
Fig. 3.
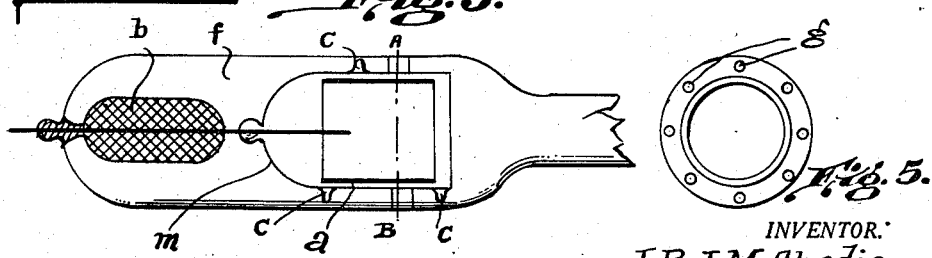
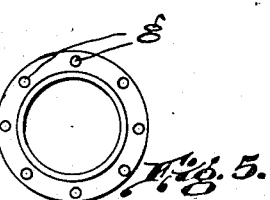
Fig. 4.   Fig. 5.
INVENTOR.
J.B.J.M. Abadie
BY Marks & Clerk
ATTORNEYS.

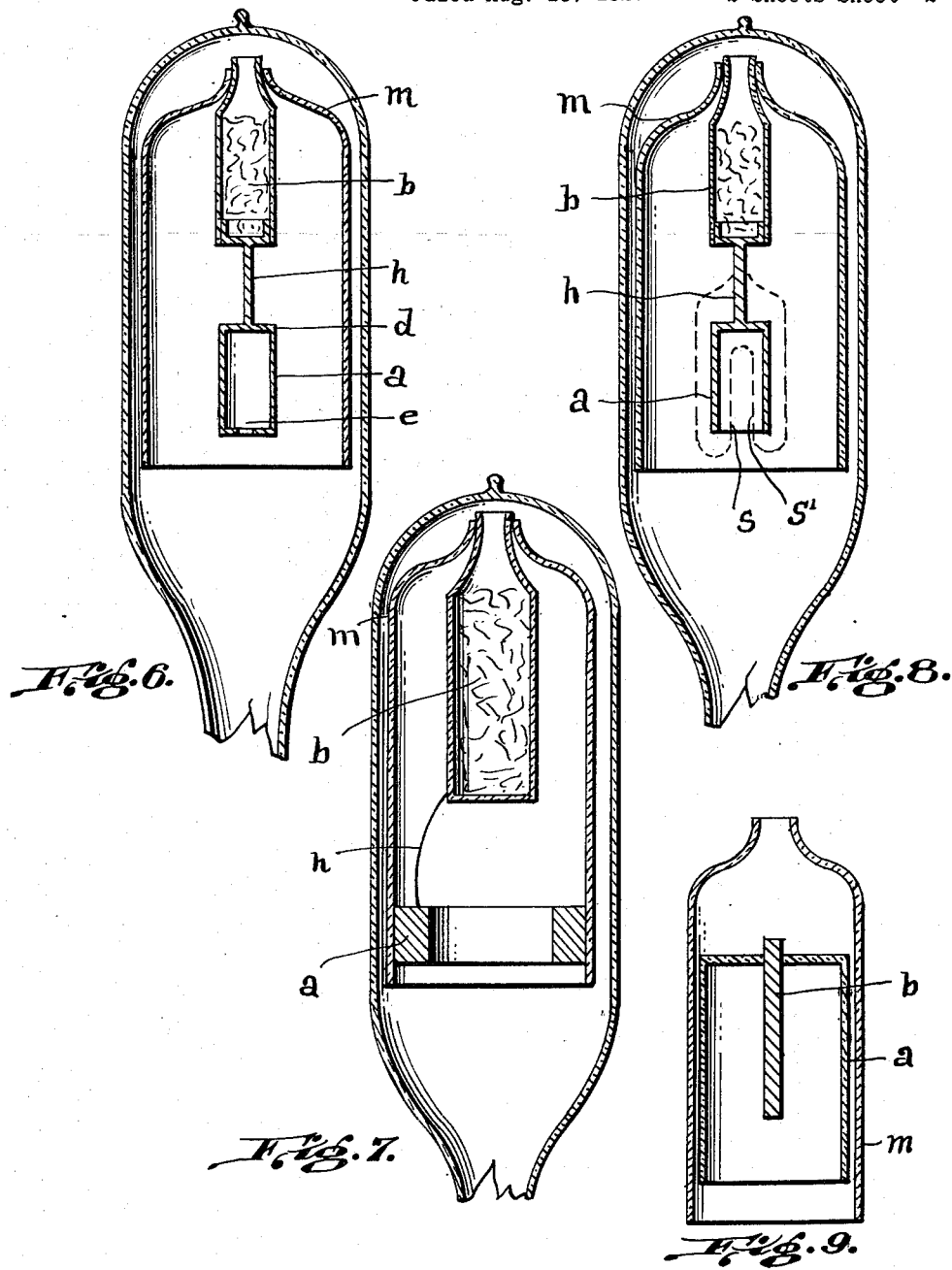

Patented Sept. 6, 1932

1,875,972

UNITED STATES PATENT OFFICE

JEAN BAPTISTE JOSEPH MARCEL ABADIE, OF PARIS, FRANCE

MAINTENANCE OF THE PRESSURE IN VACUUM TUBES

Application filed August 15, 1927, Serial No. 213,170, and in France August 26, 1926.

This invention relates to improvements in luminous tubes and has for an object to produce a tube in which the loss of gas in the tube is compensated by the addition of more gas during the operation of the tube.

A further object of the invention is to provide means for preventing a loss of gas due to the occlusion of the gas by the demetalization of the electrodes.

It has been ascertained that gas is lost in luminous tubes due to one or all of the several following causes.

(a) The absorption through the glass walls of the tube. The glass wall has always on its surface some organic elements which are always found reduced after the tube formation and they constitute an exceedingly small spongy film which causes a partial absorption of the gas especially after the extinction of the tube.

This phenomenon of absorption is always accompanied by a phenomenon of restitution after starting the tube.

It works, it seems, only during a certain time until this spongy film has been saturated by the gas which constitutes the atmosphere of the tube.

(b) The mechanical absorption through the glass walls; this phenomenon is so much the more noticeable as the diameter of the ionized column has a tendency to be larger than the interior diameter of the tube; it is therefore, easily understood that there is a violent friction between the gaseous molecules and the glass wall as a consequence of the phenomenon of the plating of these molecules caused by the electronic movement in the tube.

For this reason a remedy against this absorption has to be used by establishing sufficient diameter tubes with a pressure of gas sufficient so that, according to the normal current of the tube, the diameter of the ionized column remains inferior to the interior diameter of the tube.

Absorption due to the electrodes. The electrodes absorb the gas and this absorption can itself be subdivided in three categories of phenomena.

(1) One absorption due to the solution of the gas in the metal constituting the electrode; this phenomenon is absolutely analogous with the phenomena of solution which I have previously mentioned in the surface layer of the glass on the interior wall of the tube.

It is specially noticeable with electrodes for carbon; after the extinction of the tube provided with electrodes of carbon, a noticeable diminution of the pressure on the interior of the tube is found; when the electrodes made out of carbon have a sufficient capacity of absorption, this phenomenon may cause a hardening of the tube.

(2) The second way of absorption is due to the metal breaking-off from the electrodes caused by the electrons.

This metal breaking-off in particles causes a chemical combination between the metal particles which have been broken off in this manner and the gas which constitutes the atmosphere of the tube, if this gas is active.

(3) A physical absorption which is due to a sort of occlusion of the gaseous molecules through the metal particles broken off from the electrode.

The result from this analysis is that the phenomenon is always attached to a phenomenon of dissociation of the metal.

In accordance with the invention and for the purpose of preventing the loss of gas due to its occlusion, applicant provides a sheath of hard glass such as pyrex glass partially surrounding the electrodes for the purpose of reducing the cathode fall.

By reason of this it is possible to use an electrode relatively smaller than has heretofore been employed.

The particular means and structure for carrying out the purposes of the invention will be readily understood from the following specification and the annexed drawings in which:—

Fig 1 illustrates a form of the invention.

Figs. 2, 3, 4, 6, 7, 8 and 9 illustrate other forms thereof.

Fig. 5 is a cross section on A—B of Fig. 4.

In these figures, $a$ is a dry metallic electrode having a peripheral surface S and terminated by a surface $s$; $b$ is a gas discharge electrode consisting, for instance, of a metallic bag containing an easily decomposable salt.

The dry electrode $a$ is tangent to or having one surface level with the luminous column of the tube or the extension of the tube, containing the gas discharge electrode and is arranged in the zone of cathodic bombardment of a similar dry electrode located at the other end of the tube for ensuring the permanent passage of the greater part of the current through the dry electrode and causing the compensating emission of the gases by the calorific and chemical action of the decomposition of the salts during the cathodic fall of potential and the increase of intensity of the current due to gas pressure drop in the tube.

For that purpose, for an intensity of current $i$, characterizing the condition of operation of the tube, it will be possible to act in order to obtain a determined working pressure, either on S, surface of emission at $s$, or on $l$ or $e$, length or diameter of a tube connecting $a$ and $b$.

The working pressure can also be modified by varying the constants of the electric path $a$ and $b$ and, for that purpose, one or more neon tubes such as $g$ and $h$ can be interposed, see Fig. 1, instead of the metallic connection $n$.

$d$ is the distance between the wall of the glass of the electrode and the wall of emission of the metallic cathode $a$.

If the pressure diminishes, the depth of the zone of cathode bombardment surrounding $a$ increases until it strikes the wall of the glass. This wall prevents the passage of any current, the end part $s$ becoming alone useful for the emission and nearly all the electric discharge is directed on $b$, thus causing an intense evolution of gases.

The modification of Fig. 2 also shows this application

In the modification of Fig. 3, the dry electrode is fitted in a sleeve $m$, of hard glass such as pyrex glass, spaced from the wall by points $c$.

When the pressure diminishes, a fraction of the electric discharge tends to pass, according to the arrow, through the channel $f$ or through the circular crown comprised between the glass sleeve $m$ and the wall $d$ of the electrode, in order to reach and heat the electrode $b$ charged with salts.

The discharge electrode $b$ can also be arranged in the same glass, behind the sleeve $m$ carrying the dry electrode and a glass crown pierced with holes $g$ can be provided (see Figs. 4 and 5) which allow of graduating, according to the dimensions of the holes, the value of the resistence opposed to the passage of the fraction of current intended for the evolution of the gas.

It will be seen in all these examples, that a fraction of the electric discharge for the evolution of the gas is evolved near the dry electrode or, in a more general manner, in the dark zone (cathode bombardment surrounding the electrode).

The increase of the surface surrounded by the luminous cathodic sheath can also be used, an increase which is dependent upon the rarefaction of the gas for bringing a fraction of this hot sheath on a body capable of evolving gases, such as carbon previously treated, a salt capable of dissociating, an earth or any solvent of gas.

In the form of construction illustrated in Fig. 6, the end part $a$ of the electrode is a cylinder closed at its ends and having a hole $e$ for the evacuation of air; the rod $h$ has for object to serve as a mechanical support for $a$ and as a conductor of current and its calorific conduction can be considered as negligible; $b$ is a cylinder of fine wire gauze filled with salts and its end part fits in a sleeve $m$ made of glass.

The cylinder $a$ has a surface so that under normal condition of current and of pressure, the luminous sheath entirely surrounds it, so that if the gas is further rarefied, the surface of the luminous sheath increases and tends to reach $b$ through the rod $h$ to produce an evolution of gas, by the heating of the salt, carbon or solvent contained in $b$.

In the modification of Fig. 7, the metallic cylinder $a$ is fitted on the internal face of the support $m$, so that in this case, the gases evolved pass through the zone of demetallization of the electrode, that is to say, in a purifying and reducing zone.

In the modification of Fig. 8, the bottom of the cylinder $a$ (as shown in Fig. 6) is removed, which sensibly doubles the useful surface of the luminous sheath corresponding to the condition of minimum current; moreover, an automatic evolution of the gas is produced under a well determined pressure.

Concerning the chemical compounds, outside electrical considerations, the reabsorption of the gases by the substance of the part $b$ can be prevented when the tube is extinguished, by using unstable salts, such as silver salts, for instance or, in general, all salts which have no tendency of recombination by their simple affinity between their acid radical and their basic radical.

Metals will be chosen or, in general, the constituents of the dry electrodes, so that upon demetallization, the metallic particles pulled away by the passage of the current combined with the gas evolved by the salt or the solvent for modifying the nature of the same.

For instance, a carbon electrode forms $CO_2$, evolves $CO$, by a carbonate, which has very little affinity for the base.

Finally, in the dry electrode can be combined different elements for tinting the light obtained.

In the modification of Fig. 9, a cylinder *a* of wire gauze is arranged in a hard glass sleeve *m* and the carbon rod *b* is placed in the axis of the electrode, so that by modifying the length of this point, the white tone of the tube is modified.

To resume, this invention is based on the phenomena of an increase in the cathodic fall of potential during the absorbtion and of a widening of the dark space surrounding the electrode when the pressure diminishes and the current increases in intensity for utilizing the decomposition of salts or solvents of gases in view of compensating the pressure in the tube.

This invention is realized by the particular arrangements of the electrodes, illustrated by the devices in the drawings.

The said devices, for maintaining the rarefied atmosphere of a vacuum tube by the systematic use of the two above specified phenomena, are characterized by the disposition in the tube of two electrodes, of which *a* is the main or discharging electrode, being purely dry metallic electrode and *b* the cylindrical electrode, being a carbon rod or a metal casing containing an easily decomposable salt.

The said electrodes *a*, *b*, being placed in the tube, parallelly side by side, one before or behind the other, or one inside the other, directly in the tube or one or both in a special sleeve; the said electrodes being separated or being united by a rod or placed on two conductors, but are functioning in the same manner, that is that a fraction of the electrical effluvium from the discharging electrode is passing by a regulated passage upon the gas emitting electrode to heat it more or less when the pressure diminishes or when the current increases, widening the dark space surrounding the dry or main electrode.

I claim:

1. A gaseous conduction device comprising a tube, an electrode at one end thereof, a gas replenishing means at the other end of said tube including a metallic container for decomposing salt, and an electrode touching the projected contour of the tube intermediate said electrode and gas replenishing means.

2. A gaseous conduction device comprising a tube, an electrode at one end thereof, a gas replenishing means at the other end of said tube including a metallic container for decomposing salt, an electrode touching the projected contour of the tube intermediate said electrode and gas replenishing means; said salt being decomposed upon a rise in temperature above that due to normal operation of the tube.

In testimony whereof I have signed my name to this specification.

ABADIE, JEAN BAPTISTE JOSEPH MARCEL.